(12) United States Patent
Seo et al.

(10) Patent No.: US 9,110,203 B2
(45) Date of Patent: Aug. 18, 2015

(54) DISPLAY DEVICE WITH LIGHT GUIDE PLATE AND OPTICAL PATH CONVERSION UNIT

(75) Inventors: Eun Sung Seo, Seoul (KR); Ki Cheol Kim, Seoul (KR); In Jae Yeo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 442 days.

(21) Appl. No.: 13/368,010

(22) Filed: Feb. 7, 2012

(65) Prior Publication Data

US 2012/0206935 A1   Aug. 16, 2012

(30) Foreign Application Priority Data

Feb. 11, 2011   (KR) .................. 10-2011-0012294

(51) Int. Cl.
*F21V 7/04*   (2006.01)
*F21V 8/00*   (2006.01)

(52) U.S. Cl.
CPC ............ *G02B 6/0023* (2013.01); *G02B 6/0068* (2013.01); *G02B 6/0073* (2013.01)

(58) Field of Classification Search
None
See application file for complete search history.

(56) References Cited

U.S. PATENT DOCUMENTS

| 5,359,691 | A * | 10/1994 | Tai et al. | 385/146 |
|---|---|---|---|---|
| 2005/0013127 | A1 * | 1/2005 | Tsai | 362/31 |
| 2006/0126142 | A1 | 6/2006 | Choi | |
| 2008/0101084 | A1 * | 5/2008 | Hsu | 362/612 |
| 2009/0296017 | A1 * | 12/2009 | Itoh et al. | 349/61 |
| 2011/0007520 | A1 * | 1/2011 | Shigeta et al. | 362/607 |
| 2011/0063875 | A1 * | 3/2011 | Yang et al. | 362/621 |
| 2011/0199786 | A1 | 8/2011 | Uchida et al. | |
| 2012/0002441 | A1 * | 1/2012 | Yabe et al. | 362/607 |
| 2013/0135358 | A1 * | 5/2013 | Yin et al. | 345/690 |

FOREIGN PATENT DOCUMENTS

| JP | 2004-192937 A | 7/2004 |
|---|---|---|
| JP | 2005-085580 A | 3/2005 |
| JP | 2008-270885 A | 11/2008 |
| KR | 10-2006-0066974 A | 6/2006 |
| KR | 10-2008-0008207 A | 1/2008 |
| KR | 10-2011-0012246 A | 2/2011 |
| WO | WO-2010/016501 A1 | 2/2010 |

OTHER PUBLICATIONS

Machine translation of JP2005-071798, Mar. 17, 2005.*
Office Action dated May 7, 2013 in Japanese Application No. 2012-025788, filed Feb. 9, 2012.
Office Action dated Apr. 27, 2012 in Korean Application No. 10-2011-0012294, filed Feb. 11, 2011.
Office Action dated Jan. 10, 2013 in Korean Application No. 10-2011-0012294, filed Feb. 11, 2011.

* cited by examiner

*Primary Examiner* — Britt D Hanley
(74) *Attorney, Agent, or Firm* — Saliwanchik, Lloyd & Eisenschenk (57) ABSTRACT

Provided is a display device. The display device includes a light guide plate; a light source disposed at a lateral side of the light guide plate; and an optical path conversion unit converting a path of the light emitted from the light source. A first area corresponding to a light emitting plane of the light guide plate and a second area adjacent to the first area are defined. The optical path conversion unit is disposed in the second area.

20 Claims, 10 Drawing Sheets

DISPLAY DEVICE WITH LIGHT GUIDE PLATE AND OPTICAL PATH CONVERSION UNIT

CROSS-REFERENCE TO RELATED APPLICATION

This application claims the benefit under 35 U.S.C. §119 of Korean Patent Application No. 10-2011-0012294, filed Feb. 11, 2011, which is hereby incorporated by reference in its entirety.

TECHNICAL FIELD

The present disclosure relates to a display device.

BACKGROUND ART

A Light Emitting Diode (LED) is a semiconductor device that converts electricity into ultraviolet rays, visible rays, and infrared rays through characteristics of a compound semiconductor, and is mainly used for appliances, remote controllers, and large billboards.

A high-brightness LED light source is used for a lighting device. Since the LED has very high energy efficiency, low replacement cost (due to its long lifecycle), strong resistance to vibration or impact, and no need for toxic substances such as mercury, it replaces incandescent light bulbs or fluorescent lamps in terms of energy conservation, environmental protection, and cost reduction.

Moreover, the LED is very advantageous for a light source of large and medium sized Liquid Crystal Display (LCD) TVs and monitors. Compared to a Cold Cathode Fluorescent Lamp (CCFL), the LED has more excellent color purity and less power consumption, and is easily miniaturized. Therefore, a prototype using the LED is mass-produced currently, and its research is in progress actively.

Recently, several techniques producing white light with a blue LED by using a Quantum Dot (QD) that emits red light and green light as a fluorescent substance are introduced now. This is because white light generated using the QD has high brightness and excellent color reproduction.

However, even when the above techniques are applied to an LED backlight unit, the need for research to reduce possible light loss and improve color uniformity is still necessary.

DISCLOSURE

Technical Problem

Embodiments provide a display device having improved brightness and brightness uniformity.

Technical Solution

In one embodiment, a display device includes: a light guide plate; a light source disposed at a lateral side of the light guide plate; and an optical path conversion unit converting a path of the light emitted from the light source, wherein a first area corresponding to a light emitting plane of the light guide plate and a second area adjacent to the first area are defined; and the optical path conversion unit is disposed in the second area.

In another embodiment, a display device includes: a light guide plate; a light source disposed at a lateral side of the light guide plate; a first optical path conversion unit converting a path of the light emitted from the light source; and a second optical conversion unit converting the path of the light emitted from the light source, wherein a first area corresponding to a light emitting plane of the light guide plate and a second area adjacent to the first area are defined; the first optical path conversion unit is disposed in the second area; and the second optical path conversion unit is disposed in the first area.

In further another embodiment, a display device includes: a light guide plate; a light source emitting light to the light guide plate; and an optical path conversion unit converting a path of the light emitted from the light source, wherein the optical path conversion unit includes a third inclined plane inclined to a top side of the light guide plate.

Advantageous Effects

A display device according to an embodiment may change a path of the light emitted from the light source through the optical path conversion unit. Especially, the optical path conversion unit is disposed in the second area, that is, the outside of an area corresponding to the light emitting plane of the light source, and may change a path of light, which propagates toward the outside at a large angle, toward the inside with respect to the OA.

Accordingly, the light whose path is converted by the optical conversion member is total-reflected at the light guide plate, so that an amount of the light escaping from the light guide plate to the external may be reduced. That is, the optical path conversion unit changes a path of the light propagating toward the outside at a large angle, thereby inhibiting light from escaping through a lateral side of the light guide plate.

Moreover, the optical path conversion unit has an inclined plane inclined to the top side of the light guide plate. Accordingly, the optical path conversion unit changes a path of the light emitted from the light source, thereby total-reflecting the path changed light at the top side of the light guide plate.

Therefore, the optical path conversion unit may inhibit light from directly being emitted at the top side around the inclined plane of the light guide plate. Accordingly, the display device according to an embodiment may have improved brightness uniformity.

Additionally, the second optical path conversion unit may be disposed in the first area, that is, an area corresponding to the light emitting plane of the light source. The second optical path conversion unit may change a path of the light emitted to a periphery of the OA of the light source. Accordingly, the display device according to an embodiment may have improved brightness uniformity.

BEST MODE

In the description of embodiments, it will be understood that when a layer (or film), region, pattern or structure is referred to as being 'on' or 'under' another layer (or film), region, pad or pattern, the terminology of 'on' and 'under' includes both the meanings of 'directly' and 'indirectly'. Further, the reference about 'on' and 'under' each layer will be made on the basis of drawings. In addition, the sizes of elements and the relative sizes between elements may be exaggerated for further understanding of the present disclosure.

Figure 1:
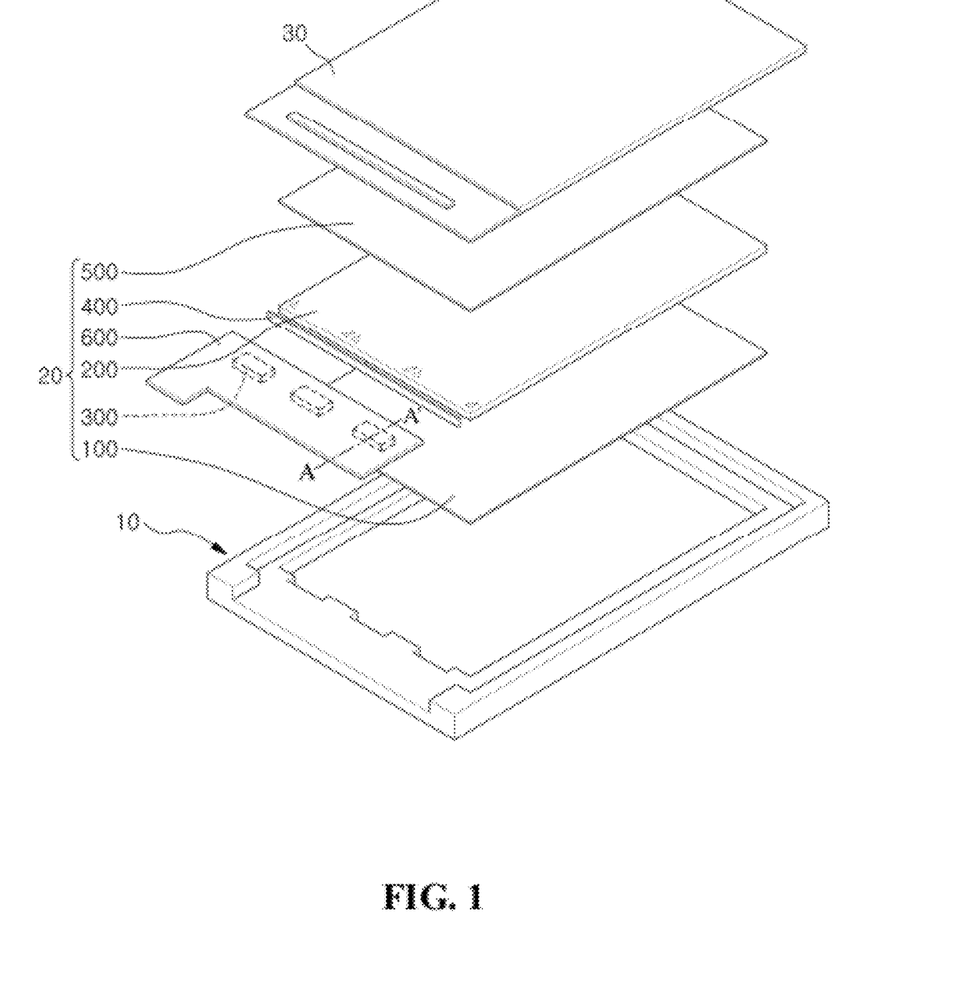
FIG. 1 is an exploded perspective view of a liquid crystal display device according to a first embodiment.
Figure 2:
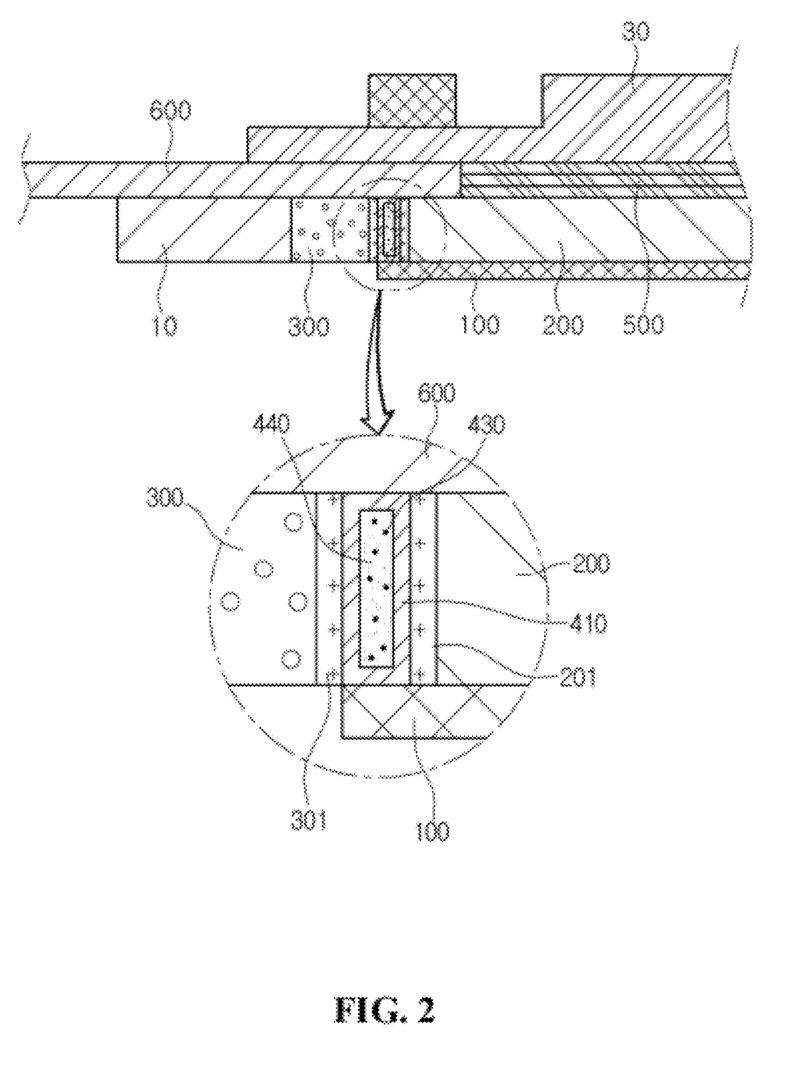
FIG. 2 is a sectional view of the liquid crystal display device according to the first embodiment.
Figure 3:
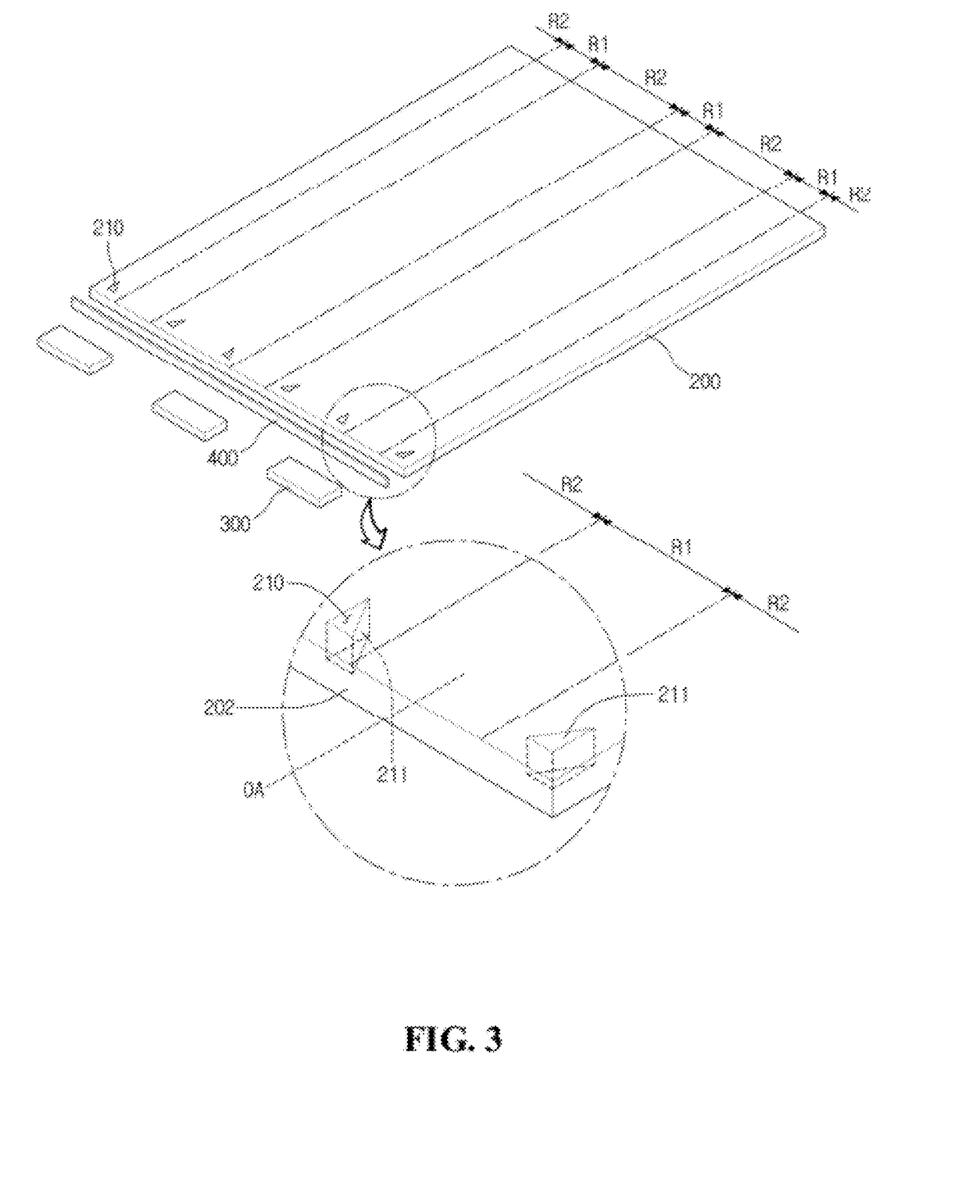
FIG. 3 is a view of light emitting diodes, an optical conversion member, and a light guide plate.
Figure 4:
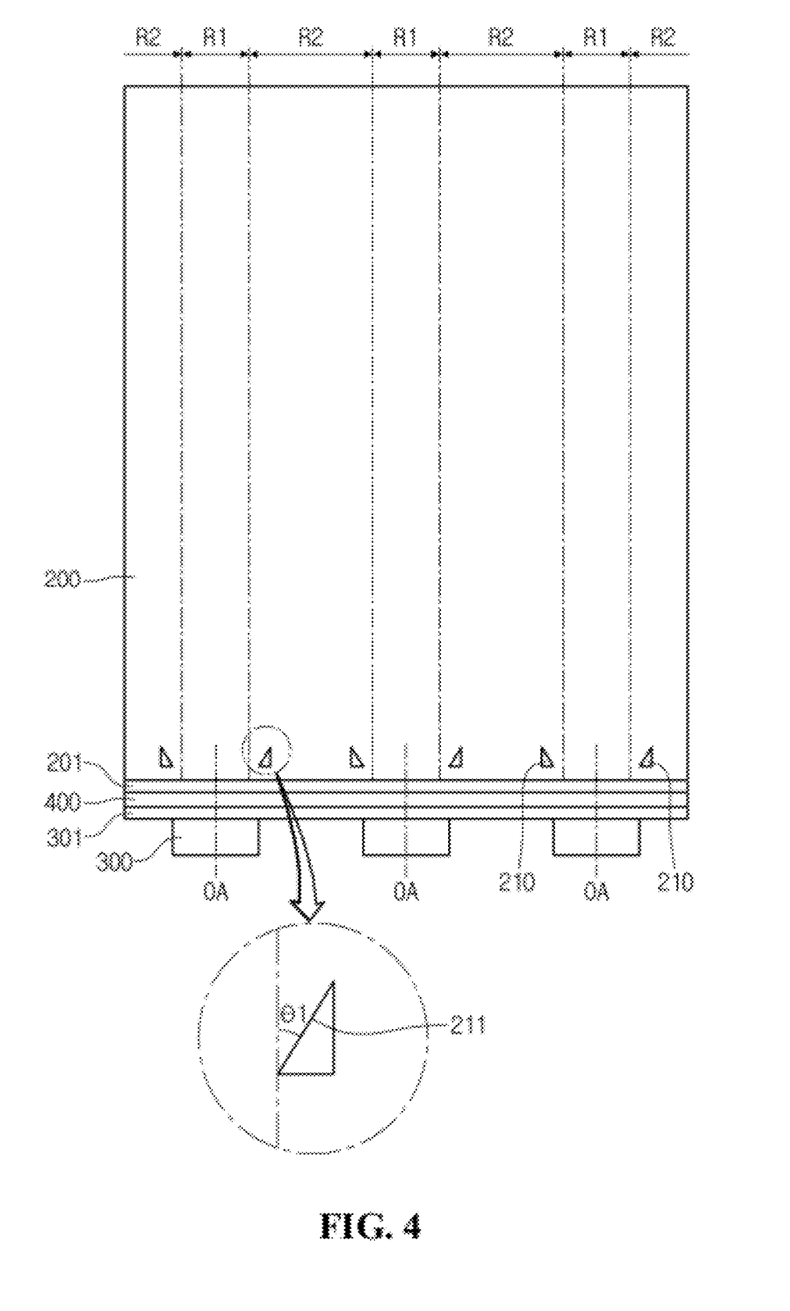
FIG. 4 is a plan view of a light emitting diode and a light guide plate.
Figure 5:
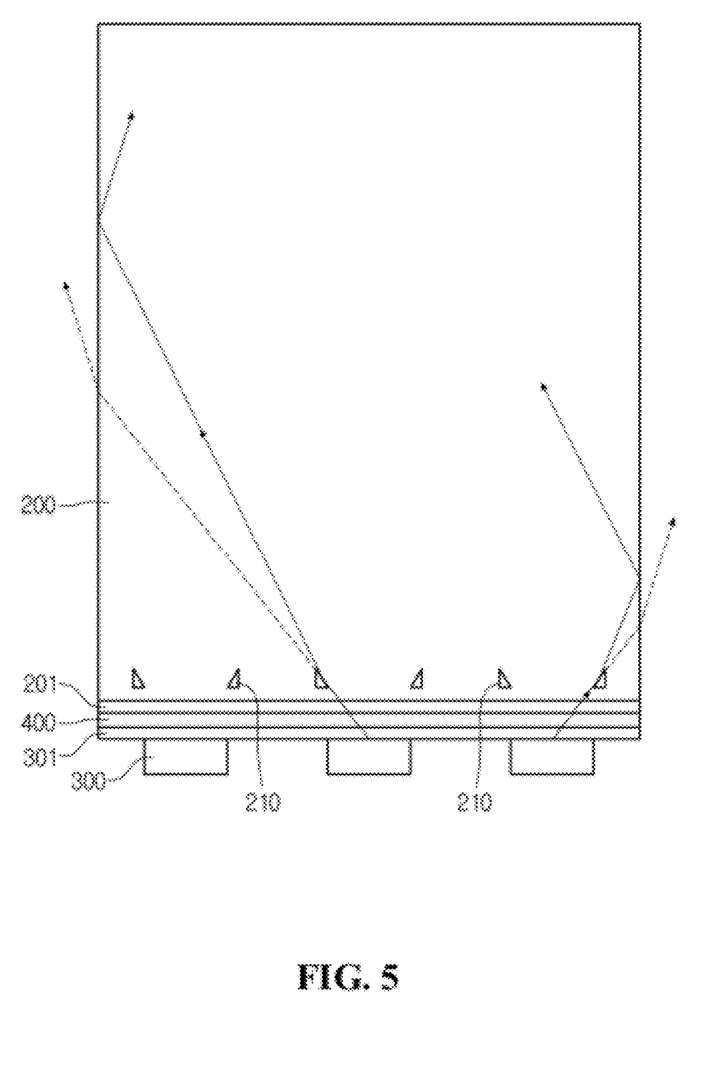
FIG. 5 is a view when light is emitted from a light emitting diode.
Figure 6:
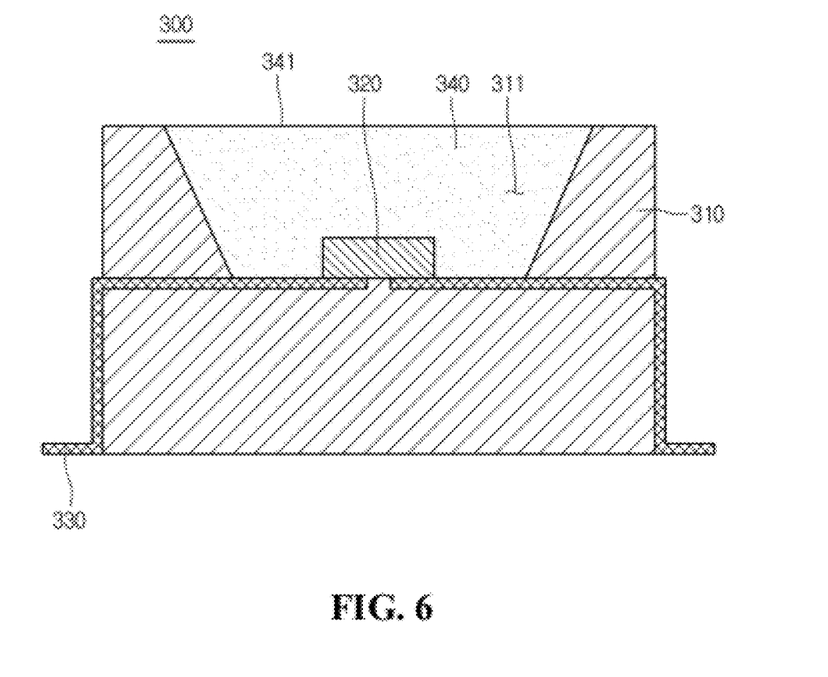
FIG. 6 is a sectional view illustrating one section of a light emitting diode.
Figure 7:
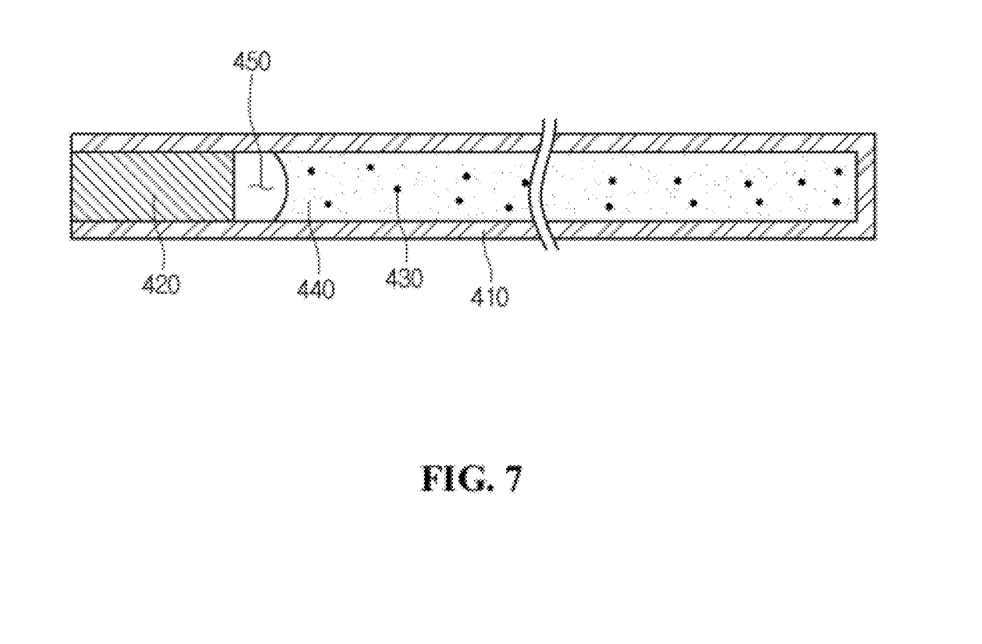
FIG. 7 is a sectional view illustrating one section of an optical conversion member.

FIG. 1 is an exploded perspective view of a liquid crystal display device according to a first embodiment. FIG. 2 is a sectional view of the liquid crystal display device according to the first embodiment. FIG. 3 is a view of light emitting diodes, an optical conversion member, and a light guide plate. FIG. 4 is a plan view of a light emitting diode and a light guide plate. FIG. 5 is a view when light is emitted from a light emitting diode. FIG. 6 is a sectional view illustrating one section of a light emitting diode. FIG. 7 is a sectional view illustrating one section of an optical conversion member.

Referring to FIGS. 1 to 7, the liquid crystal display device includes a mold frame 10, a backlight assembly 20, and a liquid crystal panel 30.

The mold frame 10 receives the backlight assembly 20 and the liquid crystal panel 30. The mold frame 10 has a rectangular frame and materials used for it may include plastics or reinforced plastics.

Additionally, a chassis surrounding the mold frame 10 and supporting the backlight assembly 20 may be disposed below the mold frame 10. The chassis may be disposed on a lateral side of the mold frame 10.

The backlight assembly 20 is disposed in the mold frame 10, and generates light to emit it toward the liquid crystal panel 30. The backlight assembly 20 includes a reflective sheet 100, a light guide plate 200, an optical path conversion unit 210, a plurality of light emitting diodes 300, an optical conversion member 400, a plurality of optical sheets 500, and a Flexible Printed Circuit Board (FPCB) 600.

The reflective sheet 100 reflects the light generated from the light emitting diodes 300 toward an upper direction.

The light guide plate 200 is disposed on the reflective sheet 100, receives an incident light emitted from the light emitting diodes 300, and reflects the received light toward an upper direction through reflection, refraction, and scattering.

The light guide plate 200 includes a light incident plane facing the light emitting diodes 300. That is, the light incident plane is a plane facing the light emitting diodes 300, which is one of the lateral sides of the light guide plate 200.

Referring to FIGS. 3 and 4, the optical path conversion unit 210 may be formed at the light guide plate 200. In more detail, the optical path conversion unit 210 may be a hole or a groove in the light guide plate 200. The optical path conversion unit 210 may penetrate the light guide plate 200.

The optical path conversion unit 210 may be disposed at the outside of an area R1 corresponding to a light emitting plane 341 of each light emitting diode 300. The optical path conversion unit 210 may be disposed at the outside of an area corresponding to each light emitting diode 300. That is, the optical path conversion unit 210 may be disposed between the light emitting diodes 300.

Here, the area R1 corresponding to the light emitting plane 341 of each light emitting diode 300 may be defined as a first area R1, and the area not corresponding to the light emitting plane 341 of each light emitting diode 300 may be defined as a second area R2. At this point, the boundary between the first area R1 and the second area R2 may be substantially parallel to an Optical Axis (OA) of the light emitting diodes 300.

Likewise, the light guide plate 200 may be divided into the first area R1 and the second area R2. The first area R1 and the second area R2 may divide the light guide plate 200 in a stripe form.

That is, the optical path conversion unit 210 may be formed at the outside of the first area R1. That is, the optical path conversion unit 210 may be formed in the second area R2.

Additionally, the optical path conversion unit 210 may be formed adjacent to the light incident plane 202 of the light guide plate 200. That is, the optical path conversion unit 210 may be formed adjacent to a lateral side having the light emitting diodes 300 disposed thereon, which is one of the lateral sides of the light guide plate 200. The optical path conversion unit 210 may include a first inclined plane 211 inclined to the OA of the light emitting diodes 300. The OA of the light emitting diodes 300 may be perpendicular to the light incident plane of the light guide plate 200. Additionally, an angle θ1 between the first inclined plane 211 and the OA of the light emitting diodes 300 may be about 25° to about 32°. In more detail, an angle θ1 between the first inclined plane 211 and the OA of the light emitting diodes 300 may be about 26° to about 29°. In more detail, an angle θ1 between the first inclined plane 211 and the OA of the light emitting diodes 300 may be about 28° to about 29°.

Additionally, the first inclined plane 211 is inclined to the light incident plane 202 of the light guide plate 200. The first inclined plane 211 may be perpendicular to the top plane of the light guide plate 200. Accordingly, the optical path conversion unit 210 may have a triangular shape, seen from the top.

The optical path conversion unit 210 may be configured to have one first inclined plane 211 in one hole. At this point, two holes may be formed in the second area R2.

Unlike this, the optical path conversion unit 210 may be configured to have two inclined planes in one hole. At this point, one hole may be formed in the second area R2.

As shown in FIG. 5, the optical path conversion unit 210 changes a path of the light emitted from the light emitting diodes 300. In more detail, the optical path conversion unit 210 may change a path of the light in order to reduce an angle between a light propagation direction from the light emitting diodes 300 and the OA of the light emitting diodes 300. That is, the optical path conversion unit 210 may change a path of the light in order to make a light propagation direction from the light emitting diodes 300 closer to the OA of the light emitting diodes 300.

The first inclined plane 211 changes a path of the light from the light emitting diodes 300 by total-reflecting the light emitted from the light emitting diodes 300. In more detail, the first inclined plane 211 changes a light propagation path of the light emitting diodes 300 to be closer to the OA of the light emitting diodes 300.

The light emitting diodes 300 are disposed on a lateral side of the light guide plate 200. In more detail, the light emitting diodes 300 are disposed on the light incident plane.

The light emitting diodes 300 are a light source generating light. In more detail, the light emitting diodes 300 emit light toward the optical conversion member 400.

In the drawings, the light emitting diodes 300 are three, but are not limited thereto. For example, the light emitting diodes 300 may be nine.

Referring to FIG. 6, the light emitting diodes 300 may include a main body unit 310, a light emitting diode chip 320, a lead electrode 330, and a filling material 340.

A cavity 311 is formed in the main body unit 310. The cavity 311 may receive the light emitting diode chip 320 and the filling material 340. Materials used for the main body unit 310 may include plastics. A reflective layer (not shown) may be coated on the inner side of the cavity to reflect the light emitted from the light emitting diode chip 320.

The light emitting diode chip 320 is disposed at the inner side of the cavity 311. The light emitting diode chip 320 receives an electrical signal through the lead electrode 330, and then, generates light. The light emitting diode chip 320 is electrically connected to the lead electrode 330.

The filling material 340 surrounds the light emitting diode chip 320. The cavity 311 may be filled with the filling material 340. The filling material 340 is transparent. The exposed external surface 341 of the filling material 340 is the light emitting plane 341 emitting light. The outgoing plane 341 may be flat or curved.

The lead electrode 330 is connected to the light emitting diode chip 320. Additionally, the lead electrode 330 is electrically connected to the FPCB 600. The lead electrode 330 and the main body unit 310 may be formed through an injection process.

The light emitting diodes 300 may be a blue light emitting diode emitting blue light or an UV light emitting diode generating ultraviolet rays. That is, the light emitting diodes 300 may generate blue light having a wavelength range between about 430 nm and about 470 nm or ultraviolet rays having a wavelength range between about 300 nm and about 400 nm.

The light emitting diodes 300 are mounted on the FPCB 600. The light emitting diodes 300 are disposed below the FPCB 600. The light emitting diodes 300 receive a driving signal through the FPCB 600, and then are driven.

The optical conversion member 400 is disposed between the light emitting diodes 300 and the light guide plate 200. The optical conversion member 400 is attached to a lateral side of the light guide plate 200. In more detail, the optical conversion member 400 is attached to the light incident plane of the light guide plate 200. Moreover, the optical conversion member 400 may be attached to the light emitting diodes 300.

The optical conversion member 400 receives the incident light emitted from the light emitting diodes 300, and then, changes its wavelength. For example, the optical conversion member 400 may change the blue light emitted from the light emitting diodes 300 into green light and red light. That is, the light emitting diodes 400 may change a portion of the blue light into green light having a wavelength range between about 520 nm and about 560 nm, and may change another portion of the blue light into red light having a wavelength range between about 630 nm and about 660 nm.

Additionally, the optical conversion member 400 may change the ultraviolet rays emitted from the light emitting diodes 300 into blue light, green light, and red light. That is, the light emitting diodes 400 may change a portion of the ultraviolet rays into blue light having a wavelength range between about 430 nm and about 470 nm, may change another portion of the ultraviolet rays into green light having a wavelength range between about 520 nm and about 560 nm, may change another portion of the ultraviolet rays into red light having a wavelength range between about 630 nm and about 660 nm.

Accordingly, the light passing through the optical conversion member 400 and the lights converted by the optical conversion member 400 may form white light. That is, the blue, green, and red lights are combined so that white light may be incident to the light guide plate 200.

Referring to FIG. 7, the optical conversion member 400 includes a tube 410, a sealing member 420, a plurality of optical conversion particles 430, and a matrix 440.

The tube 410 receives the sealing member 420, the optical conversion particles 430, and the matrix 440. That is, the tube 410 is a container that receives the sealing member 420, the optical conversion particles 430, and the matrix 440. Additionally, the tube 410 has a long shape extending in one direction.

The tube 410 may have a rectangular tube shape. That is, a section perpendicular to the length direction of the tube 410 may have a rectangular shape. Additionally, the tube 410 may have a width of about 0.6 mm, and a height of about 0.2 mm. That is, the tube 410 may be a capillary tube.

The sealing member 420 is disposed in the tube 410. The sealing member 420 is disposed at the end of the tube 410. The sealing member 420 seals the inside of the tube 410. The sealing member 420 may include epoxy resin.

The optical conversion particles 430 are disposed in the tube 410. In more detail, the optical conversion particles 430 are uniformly distributed on the matrix 440, and the matrix 440 are disposed in the tube 410.

The optical conversion particles 430 change the wavelengths of light emitted from the light emitting diodes 300. The optical conversion particles 430 receive the light emitted from the light emitting diodes 300, and then change its wavelengths. For example, the optical conversion particles 430 may change the blue light emitted from the light emitting diodes 300 into green light and red light. That is, a portion of the optical conversion particles 430 may change the blue light into green light having a wavelength range between about 520 nm and about 560 nm or another portion of the optical conversion particles 430 may change the blue light into red light having a wavelength range between about 630 nm and about 660 nm.

Unlike this, the optical conversion particles 430 may change the ultraviolet rays emitted from the light emitting diodes 300 into blue light, green light, and red light. That is, a portion of the optical conversion particles 430 may change the ultraviolet rays into blue light having a wavelength range between about 430 nm and about 470 nm, and another portion of the optical conversion particles 430 may change the ultraviolet rays into green light having a wavelength range between about 520 nm and about 560 nm. Moreover, another portion of the optical conversion particles 430 may change the ultraviolet rays into red light having a wavelength range between about 630 nm and about 660 nm.

That is, when the light emitting diodes 300 are blue light emitting diodes emitting blue light, the optical conversion particles 430 converting the blue light into green light, and red light may be used. Unlike this, when the light emitting diodes 300 are UV emitting diodes emitting ultraviolet rays, the optical conversion particles 430 converting the ultraviolet rays into blue light, green light, and red light may be used.

The optical conversion particles 430 may be a plurality of Quantum Dots (QDs). The QDs may include a core nano crystal and a skin nano crystal surrounding the core nano crystal. Moreover, the QDs may include an organic ligand coupled to the skin nano crystal. Moreover, the QDs may include an organic coating layer surrounding the skin nano crystal.

The skin nano crystal may be formed of at least two layers. The skin nano crystal is formed on the surface of the core nano crystal. The QDs may change the wavelength of light, which is incident to the core nano crystal, to be long through the skin nano crystal used for a skin layer, and also may improve light efficiency.

The QDs may include at least one of materials such as Group II compound semiconductors, Group III compound semiconductors, Group V compound semiconductors, and Group VI compound semiconductors. In more detail, the core nano crystal may include Cdse, InGaP, CdTe, CdS, ZnSe, ZnTe, ZnS, HgTe, or HgS. Additionally, the skin nano crystal may include CuZnS, CdSe, CdTe, CdS, ZnSe, ZnTe, ZnS, HgTe, or HgS. The QD may have a diameter of about 1 nm to about 10 nm.

The wavelength of light emitted from the QD may be adjustable according to the size of the QD or a molar ratio of a molecular cluster compound and a nano particle precursor during a synthesis process. The organic ligand may include pyridine, mercapto alcohol, thiol, phosphine, and phosphine oxide. The organic ligand serves to stabilize unstable QDs after synthesis. After the synthesis, a dangling bond is formed at the perimeter, and due to this, the QDs may become unstable. However, one end of the organic ligand is not bonded. The un-bonded one end of the organic ligand is bonded with the dangling bond, in order to stabilize the QDs.

Especially, if the QD has a size, which is smaller than the Bohr radius of an exciton including an electron excited due to light and electricity and a hole, quantum confinement effect occurs. Thus, the QD has a sparse energy level, and its energy gap size is changed. Additionally, charges are confined in the QD, so that high light emitting efficiency is obtained.

The QD may have varying fluorescent wavelengths according to a particle size unlike a typical fluorescent dye. That is, as the size of a particle becomes shorter, a light having a short wavelength is emitted, and fluorescence in a visible ray range of a desired wavelength may be obtained by adjusting the size of a particle. Moreover, the QD has an extinction coefficient, which is 100 to 1000 times greater than a typical dye, and a high quantum yield, so that very intensive fluorescence occurs.

The QD may be synthesized through a chemical wet method. Here, the chemical wet method is to grow a particle after putting a precursor material in an organic solvent, and is used for QD synthesis.

The matrix 440 surrounds the optical conversion particles 430. The matrix 440 uniformly distributes the optical conversion particles 430 inside. The matrix 440 may be formed of polymer. The matrix 440 is transparent. That is, the matrix 440 may be formed of transparent polymer.

The matrix 440 is disposed in the tube 410. That is, the tube 410 is entirely filled with the matrix 440. The matrix 440 may closely contact the inner side of the tube 410.

An air layer is formed between the sealing member 420 and the matrix 440. The air layer 450 is filled with nitrogen. The air layer 450 serves as a buffer between the sealing member 420 and the matrix 440.

The optical conversion member 400 may be formed through the following method.

First, the optical conversion particles 430 are uniformly distributed in a resin composition. The resin composition is transparent. The resin composition may have a photo curable characteristic.

Then, the tube 410 is decompressed inside. Thus, the entrance of the tube 410 is dipped into the resin composition having the optical conversion particles 430 distributed, and then, its perimeter pressure is increased. Accordingly, the resin composition having the optical conversion particles 430 distributed flows into the tube 410.

Then, a portion of the resin composition flowing into the tube 410 is removed, and the entrance portion of the tube 410 is emptied.

Then, a portion of the resin composition flowing into the tube 410 is hardened through ultraviolet rays, thereby forming the matrix 440.

Then, an epoxy based resin composition flows into the entrance portion of the tube 410. Then, the epoxy based resin composition is hardened, thereby forming the sealing member 420. A process for forming the sealing member 420 is performed under a nitrogen atmosphere, and accordingly, an air layer including nitrogen may be formed between the sealing member 420 and the matrix 440.

A first adhesive member 201 is interposed between the light guide plate 200 and the optical conversion member 400. The optical conversion unit 400 is attached to the light incident plane 202 of the light guide plate 200 through the first adhesive member 201. At this point, the first adhesive member 201 contacts the optical conversion unit 400 and the light incident plane 202 of the light guide plate 200.

Furthermore, a second adhesive member 301 is interposed between the light emitting diodes 300 and the optical conversion member 400. The light emitting diodes 300 are attached to the optical conversion member 400 through the second adhesive member 301. At this point, the second adhesive member 301 contacts the optical conversion unit 400 and the light emitting plane 341 of the light emitting diodes 300.

No air layer is provided between the light emitting diodes 300 and the light guide plate 200 due to the first adhesive member 201 and the second adhesive member 301. Accordingly, the media between the light emitting diodes 300 and the light guide plate 200 may have uniform reflective indices.

Accordingly, a portion of light emitted from the light emitting diodes 300 may be incident to the light guide plate 200 at a broad divergence angle. That is, since the light emitted from the light emitting diodes 300 does not pass through the air layer, it is incident to the light guide plate 200 with a broad divergence angle maintained.

Moreover, another portion of light emitted from the light emitting diodes 300 may be converted into a light having another wavelength through the optical conversion member 400. In this manner, when the wavelength is changed by the optical conversion particles 430, the converted light may be randomly emitted from the optical conversion particles 430. That is, the optical conversion particles 430 may emit light converted into various directions, regardless of the incident light.

Accordingly, the light converted by the optical conversion member 400 may be incident to the light guide plate 200 at a broader divergence angle.

As a result, a large portion of the light emitted from the light emitting diodes 300 may be incident to the light guide plate 200 in a direction deviated from the OA of the light emitting diode at a large angle.

Accordingly, a large portion of light emitted from the light emitting diodes 300 may not be total-reflected in the light guide plate 200, and may exit to the outside through the lateral side of the light guide plate 200.

At this point, the optical path conversion unit 210 may change a path of the light incident to the light guide plate 200 to be closer to the OA of the light emitting diodes 300, and thus, may induce the total reflection of the incident light in the light guide plate 200.

The optical sheets 500 are disposed on the light guide plate 200. The optical sheets 500 improve light penetration characteristics.

The FPCB 600 is electrically connected to the light emitting diode 300. The light emitting diodes 300 may be mounted. The FPCB 600 is disposed in the mold frame 10. The FPCB 600 is disposed on the light guide plate 200.

The mold frame 10 and the backlight assembly 20 constitute a backlight unit. That is, the backlight unit includes the mold frame 10 and the backlight assembly 20.

The liquid crystal panel 30 is disposed in the mold frame 10 and is also disposed on the optical sheets 500.

The liquid crystal panel 30 displays an image by adjusting the intensity of light transmitted. That is, the liquid crystal panel 30 is a display panel for displaying an image. The liquid crystal panel 30 includes a Thin Film Transistor (TFT) substrate, a color filter substrate, a liquid crystal layer interposed between the substrates, and polarizing filters.

As described above, the optical path conversion unit 210 changes a path of the light emitted from the light emitting diodes 300, and thus, induces total reflection in the light guide plate 200. Accordingly, the liquid crystal display device may reduce optical loss at the lateral side of the light guide plate 200, and may have improved brightness and brightness uniformity.

That is, a divergence angle of light incident to the light guide plate 200 may be increased by no air layer between the light emitting diodes 300 and the light guide plate 200 and the optical conversion particles 430. At this point, the liquid crystal display device may compensate for optical loss, which is caused from an increase in the divergence angle, by assembling the optical path conversion unit 210.

Figure 8:
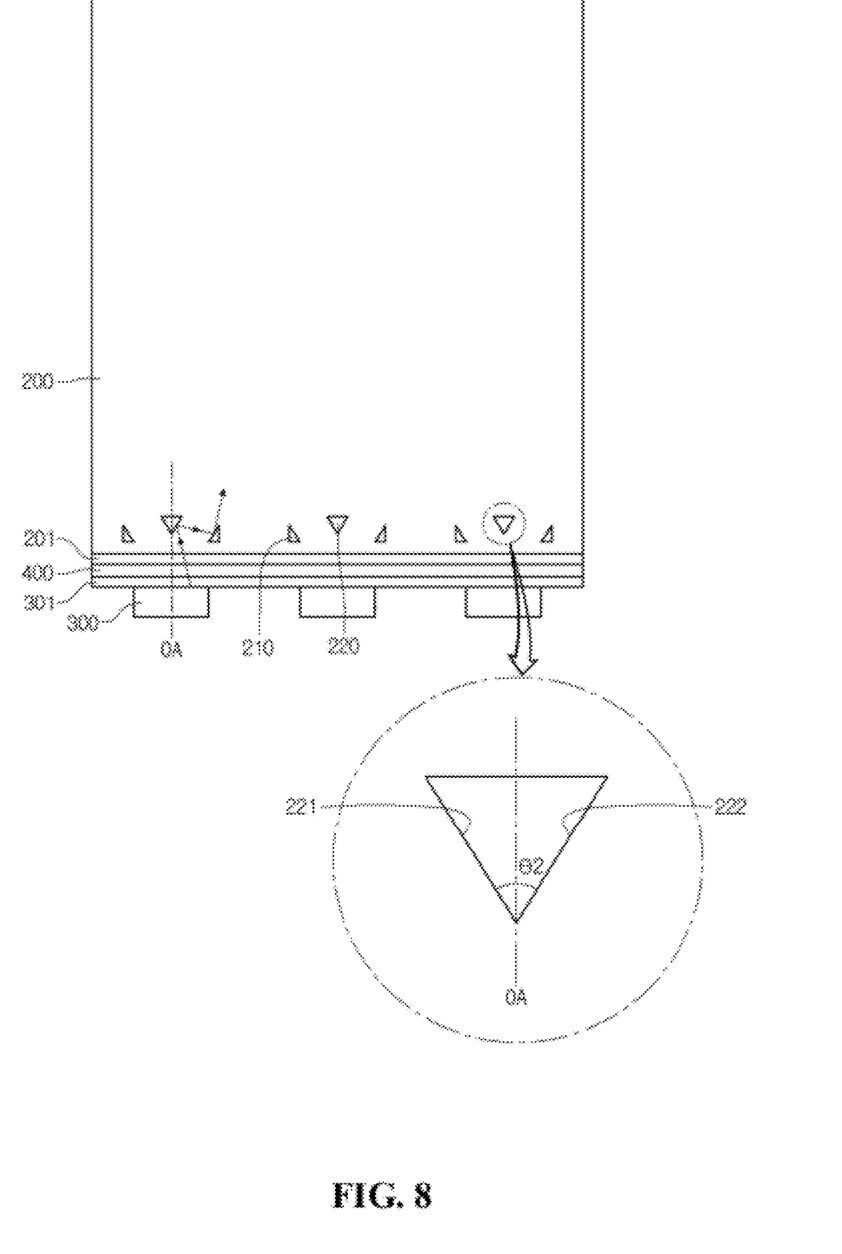
FIG. 8 is a plan view illustrating a light emitting diode and a light guide plate of a liquid crystal display device according to a second embodiment.

FIG. 8 is a plan view illustrating a light emitting diode and a light guide plate of a liquid crystal display device according to a second embodiment. Description related to this embodiment refers to that of the above liquid crystal display device, and also, a first optical path conversion unit and a second optical path conversion unit will be additionally described. Except for changed portions, description for the above embodiment may be substantially applied to that of this embodiment.

As shown in FIG. 8, the liquid crystal display device includes a first optical path conversion unit 210 and a second optical conversion unit 220.

The first optical path conversion unit 210 may be substantially identical to that of FIGS. 1 to 7.

The second optical path conversion unit 220 may be disposed in an area corresponding to the light emitting diodes 300. In more detail, the second optical path conversion unit 220 may be disposed in areas corresponding to the respective emitting surfaces of the light emitting diodes 300. In more detail, the second optical path conversion unit 220 may be disposed in correspondence to each middle portion of the light emitting diodes 300.

The second optical path conversion unit 220 may be disposed symmetric to the OA of the light emitting diode 300. The second optical path conversion unit 220 includes a first total reflection plane 221 and a second total reflection plane 222.

The first total reflection plane 221 and the second total reflection plane 222 may be inclined to the OA of the light emitting diode 300. Additionally, the first total reflection plane 221 and the second total reflection plane 222 may meet each other. The portion that the first total reflection plane 221 and the second total reflection plane 222 meet may correspond to the OA of the light emitting diode 300.

At this point, an angle θ2 between the first total reflection plane 221 and the second total reflection plane 222 may be about 40° to about 50°. In more detail, an angle θ2 between the first total reflection plane 221 and the second total reflection plane 222 may be about 44° to about 46°. In more detail, an angle θ2 between the first total reflection plane 221 and the second total reflection plane 222 may be about 45°.

The second optical path conversion unit 220 may change a path of the light emitted from the light emitting diodes 300. In more detail, the second optical path conversion unit 220 may change a path of the light in order to increase an angle between a light propagation direction from the light emitting diodes 300 and the OA of the light emitting diodes 300. That is, the second optical path conversion unit 220 may change a path of the light emitted from the light emitting diodes 300 in order to make it farther from the OA of the light emitting diodes 300.

The second optical path conversion unit 220 may be formed on the light guide plate 200. In more detail, the second optical path conversion unit 220 may be a hole or a groove in the light guide plate 200. The second optical path conversion unit 220 may penetrate the light guide plate 200. Additionally, the second optical path conversion unit 220 may be formed in a first area R1 of the light guide plate 200.

As shown in FIG. 8, the light incident to the light guide plate 200 may be propagated toward the first optical path conversion unit 210 through the second optical path conversion unit 220. Then, a path of the incident light may be changed again through the first optical path conversion unit 210 to be closer to the OA of the light emitting diode 300.

Accordingly, the incident light may change its path twice through the second optical path conversion unit 220 and the first optical path conversion unit 210. Brightness uniformity is improved through the second optical path conversion unit 220. At this point, a path of light is changed to be closer to the OA through the first optical path conversion unit 210, thereby inhibiting light loss.

Accordingly, the liquid crystal display device may have more improved brightness and brightness uniformity by combining the first optical path conversion unit 210 and the second optical path conversion unit 220.

Figure 9:
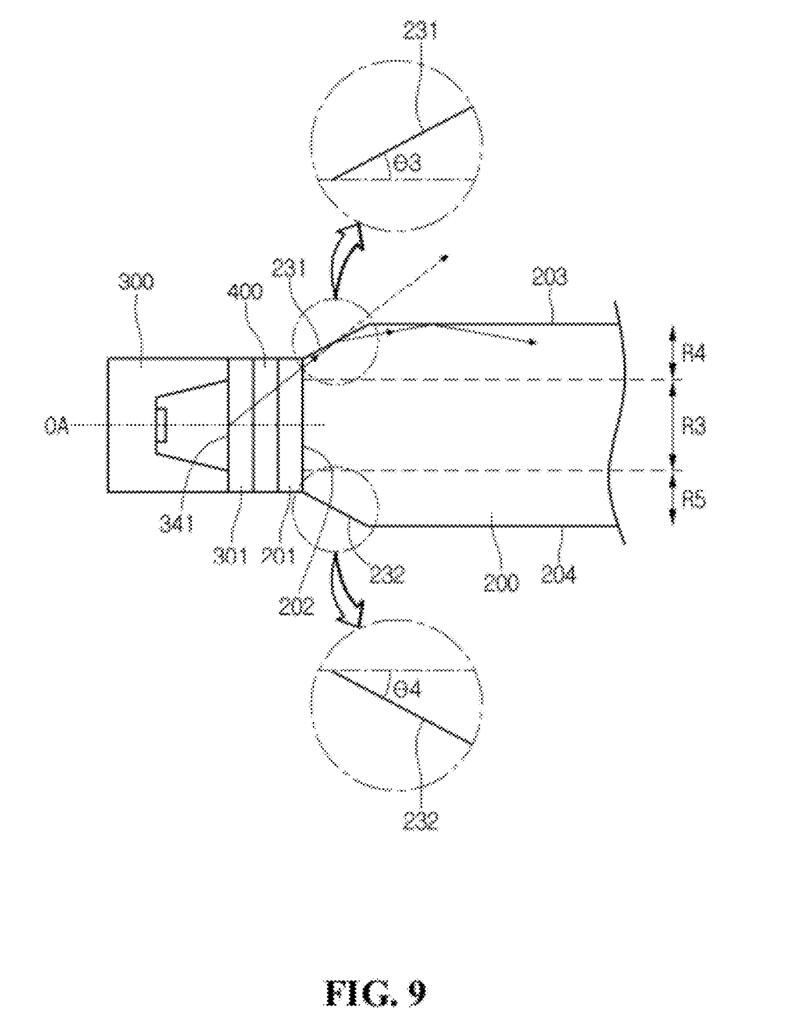
FIG. 9 is a sectional view of a liquid crystal display device according to a third embodiment.

FIG. 9 is a sectional view of a liquid crystal display device according to a third embodiment. Description related to this embodiment refers to that of the above liquid crystal display device, and also, a light guide plate and an optical path conversion unit will be additionally described. Except for changed portions, description for the above embodiment may be substantially applied to that of this embodiment.

Referring to FIG. 9, the optical path conversion unit 210 includes a third inclined plane 231 and a fourth inclined plane 232.

The third inclined plane 231 and the fourth inclined plane 232 may be inclined to the OA of the light emitting diode 300. Additionally, the third inclined plane 231 and the fourth inclined plane 232 may be inclined to the top side 203 of the light guide plate 200. Additionally, the third inclined plane 231 and the fourth inclined plane 232 may be inclined to the light incident plane 202 of the light guide plate 200.

An angle θ3 between the third inclined plane 231 and the OA of the light emitting diode 300 may be about 25° to about 30°. In more detail, an angle θ3 between the third inclined plane 231 and the OA of the light emitting diode 300 may be about 27° to about 29°.

Likewise, an angle θ4 between the fourth inclined plane 232 and the OA of the light emitting diode 300 may be about 25° to about 30°. In more detail, an angle θ4 between the fourth inclined plane 232 and the OA of the light emitting diode 300 may be about 27° to about 29°.

The third inclined plane 231 may extend from the top side 203 of the light guide plate 200 to the light incident plane 202 thereof. Additionally, the fourth inclined plane 232 may extend from the bottom side 204 of the light guide plate 200 to the light incident plane 202 thereof.

The third inclined plane 231 may be disposed at the outside of an area R3 corresponding to the light emitting plane 341 of the light emitting diode 300. That is, the third inclined plane 231 may be disposed in an area R4 between the area R3 corresponding to the light emitting plane 341 and the top side 203 of the light guide plate 200.

Likewise, the fourth inclined plane 232 may be disposed at the outside of the area R3 corresponding to the light emitting plane 341 of the light emitting diode 300. That is, the fourth inclined plane 232 may be disposed in an area R5 between the area R3 corresponding to the light emitting plane 341 and the bottom side 204 of the light guide plate 200.

As shown in FIG. 9, the third inclined plane 231 changes a path of the light emitted from the light emitting diodes 300 to be closer to the OA. Accordingly, the third inclined plane 231 inhibits the light emitted from the light emitting diodes 300 from directly being emitted to the top side 203 of the light guide plate 200. Accordingly, the third inclined plane 231 allows the light emitted from the light emitting diodes 300 to be total-reflected at the top side 203 of the light guide plate 200 at least once.

Therefore, the third inclined plane 231 and the fourth inclined plane 232 may inhibit light from being directly emitted at the top side adjacent to the light incident plane 202 of the light guide plate 200. Accordingly, the liquid crystal display device may have improved brightness uniformity.

Figure 10:
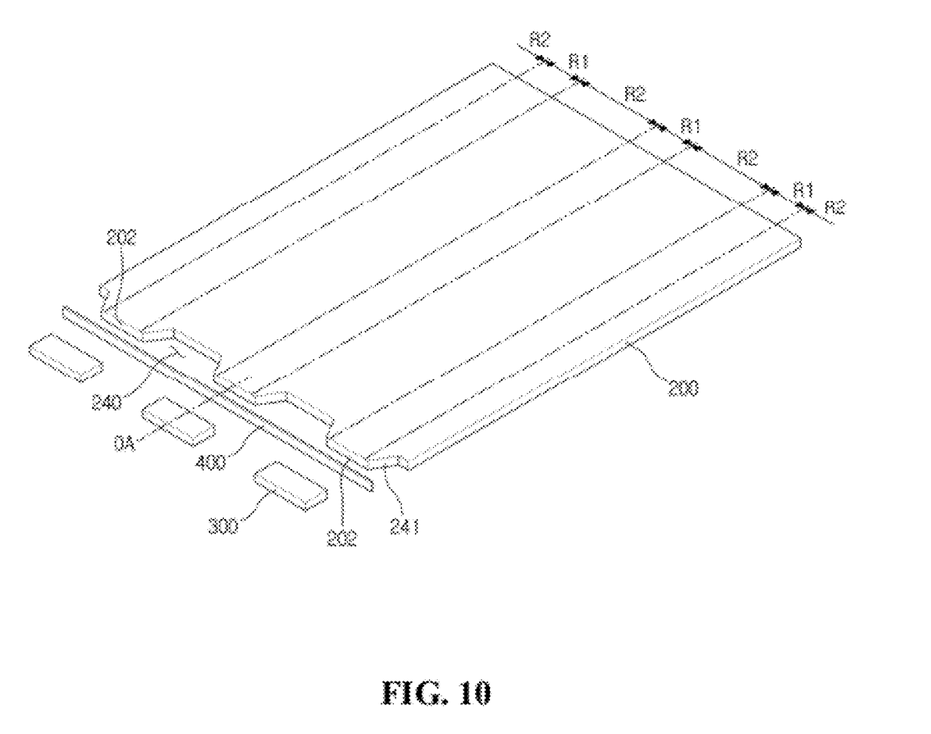
FIG. 10 is a perspective view illustrating a light emitting diode and a light guide plate of a liquid crystal display device according to a fourth embodiment.

FIG. 10 is a perspective view illustrating a light emitting diode and a light guide plate of a liquid crystal display device according to a fourth embodiment. Description related to this embodiment refers to that of the above liquid crystal display device, and also, a light guide plate and an optical path conversion unit will be additionally described. Except for changed portions, description for the above embodiment may be substantially applied to that of this embodiment.

Referring to FIG. 10, the optical path conversion unit 240 is a plurality of grooves in the light incident plane 202 of the light guide plate 200.

Additionally, the optical path conversion unit 240 may include a fifth inclined plane 241. The fifth inclined plane 241 is the inner side of the groove at the light incident plane 202 of the light guide plate 200. The fifth inclined plane 241 may be inclined to the OA of the light emitting diode 300.

The fifth inclined plane 241 may be substantially identical to the first inclined plane in the above embodiments.

Since the optical path conversion unit 240 is formed with a groove shape at the light incident plane 202 of the light guide plate 200, it may be opened in the lateral direction. Accordingly, the fifth inclined plane 241 is easily and more accurately formed.

Accordingly, the liquid crystal display device may have improved brightness and brightness uniformity.

Figure 11:
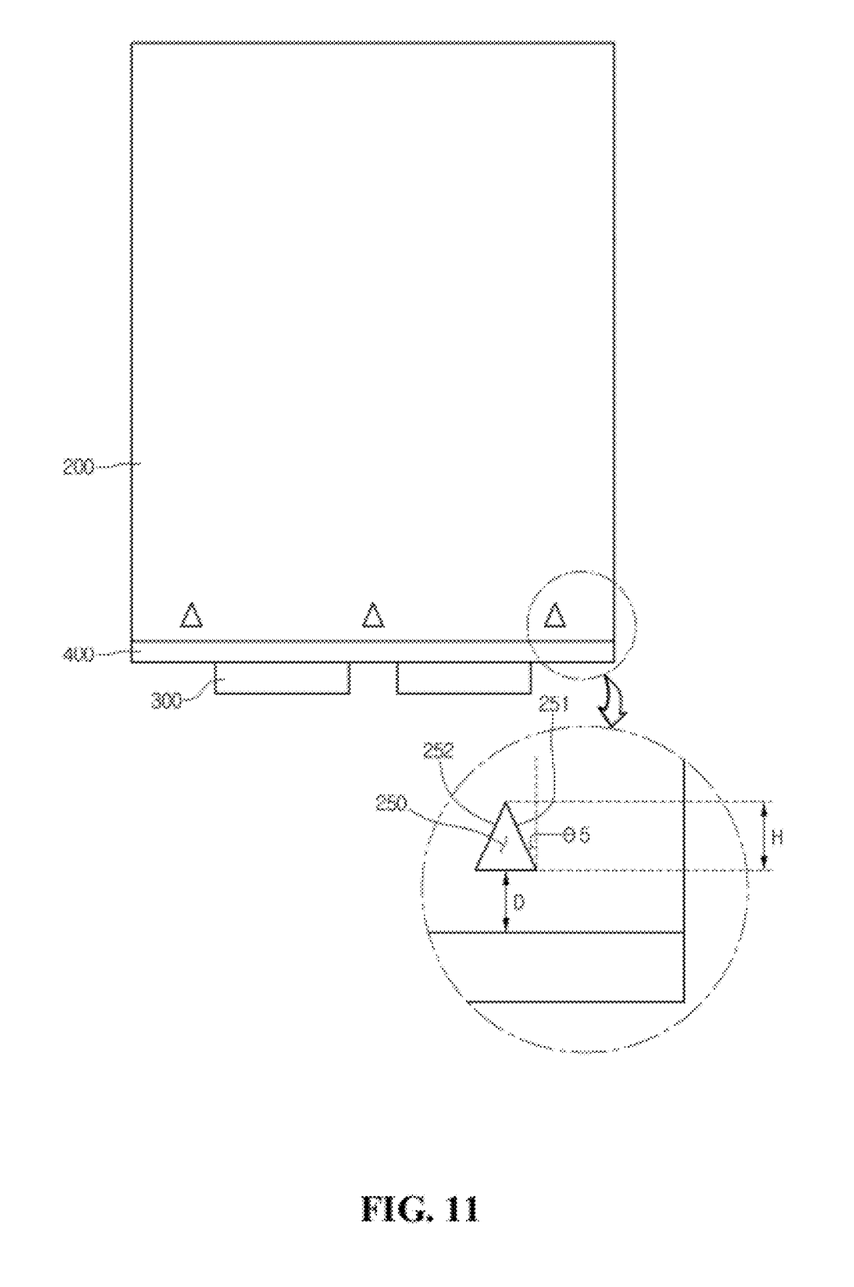
FIG. 11 is a perspective view illustrating a light guide plate, an optical conversion member, and a blue light emitting diode of a liquid crystal display device according to a fifth embodiment.

FIG. 11 is a perspective view illustrating a light guide plate, an optical conversion member, and a blue light emitting diode of a liquid crystal display device according to a fifth embodiment. Description related to this embodiment refers to that of the above liquid crystal display device, and also, a light guide plate and an optical path conversion unit will be additionally described. Except for changed portions, description for the above embodiment may be substantially applied to that of this embodiment.

Referring to FIG. 11, the optical path conversion unit 250 includes two inclined planes 251 and 252. Additionally, each light emitting diode 300 is disposed between the optical path conversion units 250. That is, there are the optical path conversion units 250 between the light emitting diodes 300.

The optical path conversion units 250 are through holes that penetrate the light guide plate 200. As seen from the top, each through hole may have an isosceles triangle shape. At this point, the length of the through hole H may be about 0.7% to about 5% of the length of the light guide plate 200. Additionally, the length H of the through hole may be about 0.3% to about 2% of the length of the light guide plate 200.

Additionally, an interval D between the optical path conversion unit 250 and the light incident plane of the light guide plate 200 may be less than about 3% of the length of the light guide plate 200. Additionally, an interval D between the optical path conversion unit 250 and the light incident plane of the light guide plate 200 may be less than about 2% of the length of the light guide plate 200.

The optical path conversion unit 250 includes two inclined planes 251 and 252. An angle θ5 between the inclined planes 251 and 252 and the OA of the light emitting diodes 300 may be about 10° to about 40°.

Since the optical path conversion unit 250 includes the two inclined planes 251 and 252, it may change a path of the light emitted from two light emitting diodes. Additionally, the optical path conversion unit 210 may be provided by forming large sized through holes in the light guide plate 250.

Accordingly, the liquid crystal display device may have improved performance and may be easily manufactured.

EXPERIMENTAL EXAMPLE #1

The light emitting device having the structure of FIG. 11 was configured and used for an experiment in experimental example #1. As shown in FIG. 11, the through holes 250 having two inclined planes 251 and 252 were formed in the light guide plate 200, and each of the blue light emitting diodes 300 was disposed between the through holes 250. Furthermore, an optical conversion member 400 including a quantum dot of Nanosys Inc. was disposed between the blue light emitting diodes 300 and the light guide plate 200. The optical conversion member 400 converted a portion of blue light from the blue light emitting diodes 300 into green light and red light. Additionally, an epoxy based adhesive (not shown) was used for close contact between the light emitting diodes 300, the optical conversion member 400, and the light guide plate 200. An angle θ5 between the OA of the blue light emitting diodes 300 and the inclined planes 251 and 252 was about 26°; the length H of the through hole was about 1.17 mm; and the plane shape of the through hole 250 was an isosceles triangle. An interval D between the light incident plane of the light guide plate 200 and the through holes 250 was about 0.2 mm.

EXPERIMENTAL EXAMPLE #2

Except the fact that white light emitting diodes including an yttrium aluminum garnet (YAG) fluorescent substance were used instead of the blue light emitting diodes, experimental example #2 was identical to experimental example #1. Moreover, the optical conversion member and the adhesive were not used, and white light emitted from the white light emitting diodes was directly incident to the light guide plate.

The structure of the light guide plate and the arrangement of the white light emitting diodes were identical to those of experimental example #1.

COMPARATIVE EXAMPLE #1

Except for the fact that no through holes were formed in the light guide plate, comparative example #1 was identical to experimental example #1.

COMPARATIVE EXAMPLE #2

Except for the fact that no through holes were formed in the light guide plate, comparative example #2 was identical to experimental example #2.

Result

Each experimental example and comparative example measured the brightness of light emitted through the top side of the light guide plate. When experimental example #1 was compared to comparative example #1 in terms of brightness, the brightness in experimental example #1 was more improved by about 27.8%. Moreover, when experimental example #2 was compared to comparative example #2 in terms of brightness, the brightness in experimental example #2 is more improved by about 18.3%.

As shown in the above, when an inclined plane was formed at the outside of the light emitting plane of the light emitting diode to change a path of light, the brightness of light emitted from the top side of the light guide plate was more improved.

Furthermore, when a path of light was changed inward in a structure having an optical conversion member of a plurality of optical conversion particles, it was apparent that more improved brightness was provided.

Additionally, the features, structures, and effects described in the above embodiments are included in at least one embodiment, but the present invention is not limited thereto. Furthermore, the features, structures, and effects in each embodiment may be combined or modified for other embodiments by those skilled in the art. Accordingly, contents regarding the combination and modification should be construed as being in the scope of the present invention.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A display device comprising:
a light guide plate;
a light source disposed at a lateral side of the light guide plate;
an optical conversion member interposed between the light source and the light guide plate;
a first adhesive member in direct physical contact with the optical conversion member and a light incident plane of the light guide plate;
a second adhesive member in direct physical contact with the optical conversion member and a light emitting plane of the light source; and
an optical path conversion unit converting a path of light emitted from the light source;
wherein the light guide plate comprises a first area corresponding to the light emitting plane of the light source and a second area adjacent to the first area;
wherein the optical path conversion unit is disposed in the second area;
wherein the optical conversion member includes a tube, a matrix, and a plurality of quantum dots, and
wherein the matrix surrounds the quantum dots in the tube.

2. The display device according to claim 1, wherein the optical path conversion unit comprises a hole penetrating the light guide plate.

3. The display device according to claim 1, wherein the optical path conversion unit comprises a groove at a lateral side of the light guide plate.

4. The display device according to claim 1, wherein the optical path conversion unit comprises an inclined plane that total-reflects the light emitted from the light source.

5. The display device according to claim 4, wherein the inclined plane is inclined to an optical axis of the light source.

6. The display device according to claim 1, wherein the optical path conversion unit changes the path of the light from the light source to allow an angle between a propagation direction of the light from the light source and the optical axis of the lights source to be smaller.

7. The display device according to claim 1, wherein the optical path conversion unit comprises a third inclined plane that extends from a top side of the light guide plate to a lateral side thereof.

8. The display device according to claim 7, wherein the optical path conversion unit comprises a fourth inclined plane that extends from a bottom side of the light guide plate to a light incident plane thereof.

9. A display device comprising:
a light guide plate;
a light source disposed at a lateral side of the light guide plate;
an optical conversion member interposed between the light source and the light guide plate;
a first adhesive member in direct physical contact with the optical conversion member and a light incident plane of the light guide plate;
a second adhesive member in direct physical contact with the optical conversion member and a light emitting plane of the light source;
a first optical path conversion unit converting a path of light emitted from the light source; and
a second optical conversion unit converting the path of the light emitted from the light source;
wherein the light guide plate comprises a first area corresponding to a light emitting plane of the light source and a second area adjacent to the first area;
wherein the first optical path conversion unit is disposed in the second area;
wherein the second optical path conversion unit is disposed in the first area;
wherein the optical conversion member includes a tube, a matrix, and a plurality of quantum dots; and
wherein the matrix surrounds the quantum dots in the tube.

10. The display device according to claim 9, wherein the second optical path conversion unit is disposed in correspondence to an optical axis of the light source.

11. The display device according to claim 9, wherein the second optical path conversion unit comprises a total reflection plane inclined to a light incident plane of the light guide plate.

12. The display device according to claim 11, wherein
the total reflection plane comprises a first total reflection plane and a second total reflection plane; and
the first total reflection plane and the second total reflection plane meet each other.

13. The display device according to claim 9, wherein the second optical path conversion unit comprises a hole or a groove in the light guide plate.

14. A display device comprising:
a light guide plate;
a light source emitting light to the light guide plate;
an optical conversion member interposed between the light source and the light guide plate;
a first adhesive member in direct physical contact with the optical conversion member and a light incident plane of the light guide plate;
a second adhesive member in direct physical contact with the optical conversion member and a light emitting plane of the light source; and
an optical path conversion unit converting a path of light emitted from the light source;
wherein the optical path conversion unit comprises a third inclined plane inclined with respect to a top side of the light guide plate;
wherein the optical conversion member includes a tube a matrix and a plurality of quantum dots; and
wherein the matrix surrounds the quantum dots in the tube.

15. The display device according to claim 14, wherein the third inclined plane is disposed lower than the top side of the light guide plate and higher than an area corresponding to a light emitting plane of the light source.

16. The display device according to claim 14, wherein the optical path conversion unit comprises a fourth inclined plane inclined to a bottom side of the light guide plate; and
the fourth inclined plane is disposed higher than the bottom side of the light guide plate and lower than an area corresponding to the light emitting plane of the light source.

17. The display device according to claim 14, wherein an angle between the third inclined plane and an optical axis of the light source is about 25° to about 30°.

18. The display device according to claim 1, further comprising a printed circuit board (PCB) covering the light source and the optical conversion member.

19. The display device according to claim 9, further comprising a printed circuit board (PCB) covering the light source and the optical conversion member.

20. The display device according to claim 14, further comprising a printed circuit board (PCB) covering the light source and the optical conversion member.

* * * * *